UNITED STATES PATENT OFFICE.

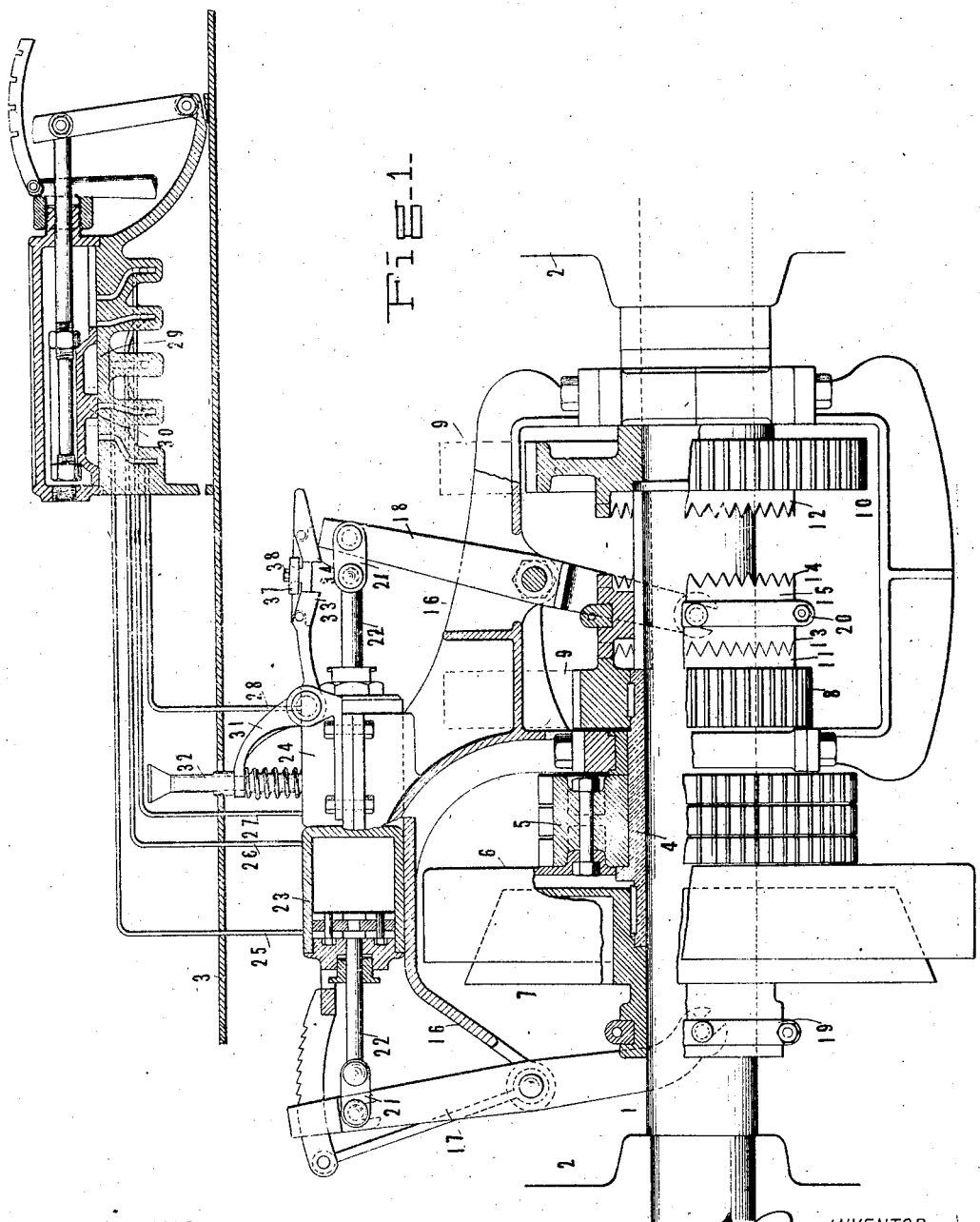

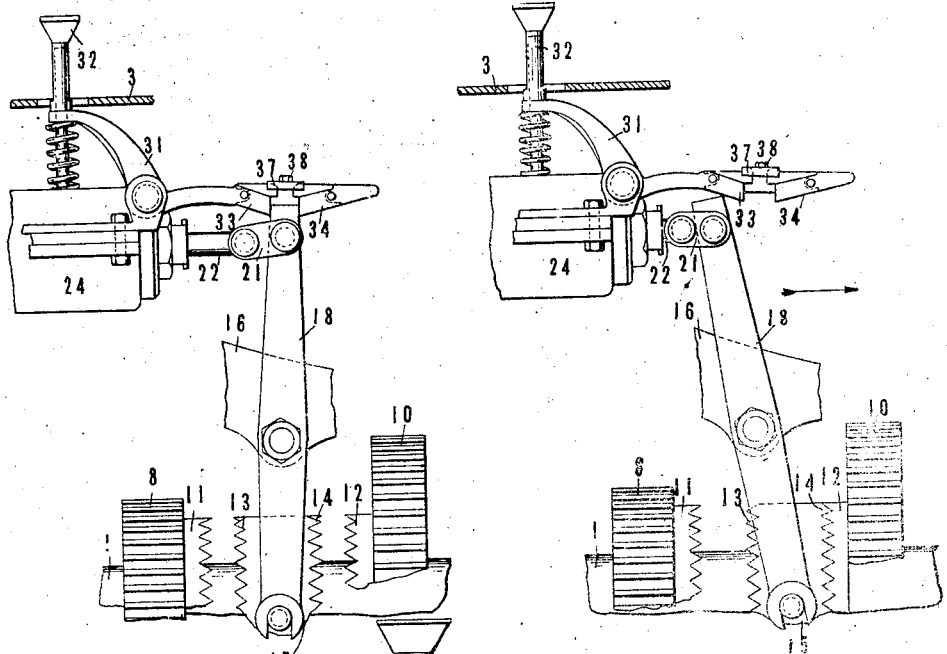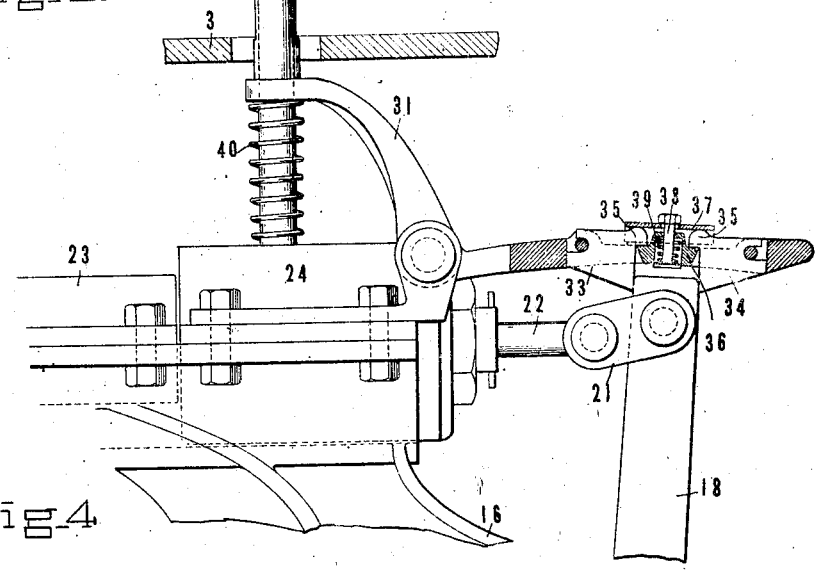

WILLIAM R. McKEEN, JR., OF OMAHA, NEBRASKA, ASSIGNOR TO EDWARD H. HARRIMAN, OF ARDEN, NEW YORK.

POWER-CONTROLLING APPARATUS.

937,844.

Specification of Letters Patent. Patented Oct. 26, 1909.

Application filed February 19, 1907. Serial No. 358,317.

*To all whom it may concern:*

Be it known that I, WILLIAM R. McKEEN, Jr., residing at Omaha, in the county of Douglas and State of Nebraska, have invented certain new and useful Improvements in Power-Controlling Apparatus, of which the following is a full, clear, and exact description, such as will enable others skilled in the art to which it appertains to make and use the same.

This invention relates to the control of power transmitting apparatus, and with regard to the more specific features thereof to the control of the action of speed-changing mechanism.

One of the objects thereof is to provide efficient and durable means for controlling the transmission of power and the speed of driven members.

Another object is to provide automatically acting means in connection with means of the above type for insuring against injury to the parts due to a careless or too rapid actuation thereof.

Another object is to provide practical means in connection with toothed or intermeshing members whereby accidental throwing of the same into engagement one with another is prevented.

Other objects will be in part obvious and in part pointed out hereinafter.

The invention accordingly consists in the features of construction, combinations of elements and arrangement of parts which will be exemplified in the embodiment hereinafter set forth, and the scope of the application of which will be indicated in the following claims.

In the accompanying drawings, wherein is shown one of various possible embodiments of my invention,—Figure 1 is a sectional elevation thereof, in part diagrammatic. Fig. 2 is a detail view of certain parts shown in Fig. 1, the same appearing in another position. Fig. 3 is a similar view showing the parts in a third position. Fig. 4 is a detail elevation upon a larger scale, showing parts appearing in Fig. 1 and having certain portions broken away in order to show the construction more clearly.

Similar reference characters refer to similar parts throughout the several views of the drawings.

As tending to cast light upon certain features of this invention, it may be noted that in the throwing of positively acting speed changing mechanism there is a likelihood of injuring or even stripping the teeth or equivalent portions of the members entering into mesh, even though the power be off at the time of shifting the parts. This tendency, which obtains largely by reason of the inertia of the moving members, often results in irreparable injury to valuable parts and the breaking down of the entire apparatus. The provision of practical and efficient means for doing away with this feature of speed changing mechanism is one of the aims of this invention, and is, among others, achieved in apparatus of the nature of that hereinafter described.

Referring now to Fig. 1 of the accompanying drawings, there is shown a car axle 1 provided with the wheels 2, the floor of the car body being indicated at 3. Loosely mounted upon axle or shaft 1 is a sleeve 4 upon which is in turn loosely journaled a driving member 5, preferably of sprocket conformation and receiving power from any desired source. Bolted to sprocket 5 is a clutch member 6 adapted to co-act with a clutch member 7 slidingly keyed to the sleeve 4. From sleeve 4 power is transmitted to a gear 8 fast thereon, and connected as by reducing gearing 9 with a gear 10 loosely journaled upon the axle. Gears 8 and 10 are thus driven from the sprocket 5, assuming the clutch member 7 to be thrown inwardly, and the speed of these members is different and may be given any desired value, depending upon the speed of driving of the sprocket. Upon the inner faces of gears 8 and 10 are formed clutch elements 11 and 12, respectively adapted to mesh with the faces 13 and 14 of an intermediate clutch member 15 slidably keyed to the axle 1. Upon a frame 16, mounted as shown, are pivoted the levers 17 and 18, which respectively engage clutch members 7 and 15 by suitable loose rings 19 and 20. Levers 17 and 18 may, if desired, be actuated by hand without sacrifice of all of the advantages of my invention, but in the preferred embodiment shown are connected as by links 21 and piston-rods 22 with suitable pistons in the cylinders 23 and 24 respectively. The actuation of these pistons at the desired times is brought about through the proper admission of compressed air to the corresponding cylinders, through the conduits 25, 26, 27 and 28, leading from a valve seat 29. The precise construction of this valve seat, as well as that of the co-acting valve 30, form in themselves no feature of the present invention, and for a satisfactory description of the same cross reference is hereby made to my Patent No. 862,186, August 6, 1907. For certain other features herein shown and described reference is hereby made to my copending application Serial No. 292,447, filed December 19, 1905, in which the same are fully described and claimed.

The operation of the mechanism above set forth is as follows: Assuming the clutch 7 to be thrown in and gears 8 and 10 to be driven at different rates of speed as above set forth, the continuity as well as the rate of drive of the axle 1 is governed by the position of the clutch member 15. The latter member partakes of the rate of revolution of the clutch member with which it is in mesh, and thus is not in synchronism with the remaining clutch member, and obviously not in condition to be thrown suddenly into mesh therewith. Even though the clutch 7 be automatically thrown out by valve 30 prior to a throwing of the lever 18, nevertheless, by reason of the inertia of the parts, if the clutch member 15 be thrown directly to the opposite limit of its path of travel there is a likelihood of injury to the teeth thus brought into engagement. In order to interrupt the travel of the lever 18 from one extreme position to another, the same is provided with a square end adapted to pass beneath a spring pressed bell crank lever 31 which may be raised or released as by the foot rest 32. Lever 31, as is best shown in Fig. 4 of the drawings, is provided with a pair of pivot latches 33 and 34, having their contiguous faces of abrupt conformation and the outwardly disposed faces upwardly inclined in a direction away from one another. These latches are normally depressed into their lowermost position, limited by the shoulders 35 engaging the shoulders 36 by a cross-head 37 mounted upon a pin 38 provided with a spiral spring 39. It will thus be seen that upon the lever 18 approaching mid-position it raises the first latch met thereby, as the latch 33 in Fig. 3 of the drawings, assuming the same to travel in the direction indicated by the arrow, and is brought to a stop by the inner face of the latch 34, the latch 33 snapping down behind the same as shown in Fig. 2. In traveling in the reverse direction the lever is stopped in the same position, a reverse action taking place in the latches 33 and 34. There is thus of necessity a brief period of rest until lever 31 is released as by the depression of the foot rest 32, compressing spring 40 and raising the latches. The lever 18 then completes its travel, and the clutch member 15 is thrown into mesh with the clutch member toward which it has been moved.

It may here be noted that terms of the nature of "lock" as used throughout the following claims are intended to cover any action by which the parts with reference to which they are used are materially retarded or brought to a standstill.

The operation of the above-described embodiment of my invention, in so far as the same has not been already set forth, is substantially as follows: Assuming that it be desired to throw the clutch member 15 from the position shown in Fig. 1 of the drawings to that indicated in Fig. 3, with a consequent diminution in speed of the axle 1, the valve 30 is so manipulated as to admit compressed fluid to the crank end of the cylinder 23, thus retracting the corresponding piston and throwing out the clutch 7. Compressed air or other fluid is then admitted to the crank end of the cylinder 24, tending to swing the lever 18 to its opposite extreme. This lever is stopped in intermediate position, however, by the latch 33 as above described, and an interval of rest occurs during its release as by the foot rest 32. Upon release the lever completes its movement and clutch member 15 is thrown into mesh with clutch member 12.

It will thus be seen that I have provided apparatus in which the several objects of my invention are achieved, and that the above-enumerated advantages are, among others, present. The mechanism is simple and yet thoroughly effective, and serves as an automatic check whereby injury to the parts is prevented. The time of action of the speed changing mechanism, moreover, is not materially increased, inasmuch as a brief pause in its action has been found entirely efficient in achieving the ends sought.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. In apparatus of the class described, in combination, a source of power, a driven member, means adapted to connect said source of power with said driven member, and having speed changing means interposed therein, means adapted automatically to disconnect said source of power during the actuation of said speed changing means, means adapted to interrupt the action of said speed changing means, and means adapted to render inoperative said interrupting means.

2. In apparatus of the class described, in combination, a source of power, a driven member, means adapted to connect said source of power with said driven member, and having speed changing means interposed therein, means adapted automatically to disconnect said source of power during the actuation of said speed changing means, said speed changing means being adapted to assume a plurality of operative positions, and means adapted to lock said speed changing means in a position intermediate two of its operative positions.

3. In apparatus of the class described, in combination, a source of power, a driven member, means adapted to connect said source of power with said driven member, and having speed changing means interposed therein, single means adapted to disconnect said source of power prior to the actuation of said speed changing means and actuate said speed changing means, said speed changing means being adapted to assume a plurality of operative positions, and means adapted to lock said speed changing means intermediate two of its operative positions.

4. In apparatus of the class described, in combination, a source of power, a driven member, means adapted to connect said source of power with said driven member, said means comprising positive clutch mechanism adapted upon actuation to vary the speed at which said driven member is driven, means adapted automatically to disconnect said source of power during the actuation of said clutch mechanism, said positive clutch mechanism being adapted to assume a plurality of operative conditions, and means adapted to lock the same in an intermediate condition on passing from one to another of said operative conditions.

5. In apparatus of the class described, in combination, a source of power, a driven member, means adapted to connect said source of power with said driven member, said means comprising positive clutch mechanism adapted upon actuation to vary the speed at which said driven member is driven, means adapted automatically to disconnect said source of power during the actuation of said clutch mechanism, said positive clutch mechanism being adapted to assume a plurality of operative conditions, and means adapted automatically to lock the same in an intermediate condition upon passing from one to another of said operative conditions.

6. In apparatus of the class described, in combination, a source of power, a driven member, means adapted to connect said source of power with said driven member, said means comprising positive clutch mechanism adapted upon actuation to vary the speed at which said driven member is driven, means adapted automatically to disconnect said source of power during the actuation of said clutch mechanism, said positive clutch mechanism being adapted to assume a plurality of operative conditions, and means adapted automatically to lock the same in an intermediate condition upon passing in either direction from one to another of said operative conditions.

7. In apparatus of the class described, in combination, a source of power, a driven member, means adapted to connect said source of power with said driven member, said means comprising positive clutch mechanism adapted upon actuation to vary the speed at which said driven member is driven, means adapted automatically to disconnect said source of power during the actuation of said clutch mechanism, said positive clutch mechanism being adapted to assume a plurality of operative conditions, and means adapted to lock the same in an intermediate condition upon passing in either direction from one to another of said operative conditions.

8. In apparatus of the class described, in combination, a car floor, car wheels, means mounted beneath said floor adapted to transmit power to said wheels, speed changing means interposed within said power transmitting means, means controlling the action of said speed changing means and positioned above the car floor, said speed changing means comprising a member adapted to assume a plurality of operative positions, means adapted automatically to lock said member in an intermediate position upon passage from one to another of said operative positions, and means positioned above said car floor adapted to release said locking means.

9. In apparatus of the class described, in combination, a driving member, a member driven therefrom, speed changing means interposed between said driving and said driven members and adapted to vary the rate of drive, said speed changing means comprising a member adapted to assume a plurality of operative positions, means connected with said member and controlling the position thereof, means adapted to engage and lock said last-mentioned means in a position corresponding to an inoperative position of said member, and means adapted to release said locking means, said locking means comprising a pair of spring pressed latches, one of which is adapted to interrupt the travel of said second means in one direction and the other of which is adapted to interrupt its travel in the opposite direction.

10. In apparatus of the class described, in combination, a driving member, a member driven therefrom, speed changing means interposed between said driving and said driven members and adapted to vary the rate of drive, said speed changing means comprising a member adapted to assume a plurality of operative positions, means connected with and controlling the position of said member, means comprising a pair of latches, one of which is adapted to interrupt the travel of said last means in one direction and the other of which is adapted to interrupt the travel of the same in the other direction, and means adapted to raise said latches and release said second means.

11. In apparatus of the class described, in combination, a driving member, a member driven therefrom, speed changing means interposed between said driving and said driven members and adapted to vary the rate of drive, said speed changing means comprising a member adapted to assume a plurality of operative positions, means connected with and controlling the position of said member, means comprising a pair of latches, one of which is adapted to interrupt the travel of said last means in one direction and the other of which is adapted to interrupt the travel of the same in the other direction, and means adapted to raise said latches and release said second means, said latches being provided with inclined faces upon the sides remote one from another.

12. In apparatus of the class described, in combination, a driving member, a member driven therefrom, speed changing means interposed between said driving and said driven members and adapted to vary the rate of drive, said speed changing means comprising a member adapted to assume a plurality of operative positions, means connected with and controlling the position of said member, means comprising a pair of latches, one of which is adapted to interrupt the travel of said last means in one direction and the other of which is adapted to interrupt the travel of the same in the other direction, and means adapted to raise said latches and release said second means, said latches being provided with inclined faces upon the sides remote one from another and being spring pressed into operative position.

13. In apparatus of the class described, in combination, a driving member, a member driven therefrom, speed changing means interposed between said driving and said driven members and adapted to vary the rate of drive, said speed changing means comprising a member adapted to assume a plurality of operative positions, means connected with and controlling the position of said member, a lever mounted adjacent said means and adapted to swing away from the same, and a pair of latches upon said lever one of which is adapted to interrupt the travel of said second means in one direction and the other of which is adapted to interrupt the travel of the same in the opposite direction.

14. In apparatus of the class described, in combination, a driving member, a member driven therefrom, speed changing means interposed between said driving and said driven members and adapted to vary the rate of drive, said speed changing means comprising a member adapted to assume a plurality of operative positions, means connected with and controlling the position of said member, a lever mounted adjacent said means adapted to swing away from the same, and a pair of latches upon said lever, one of which is adapted to interrupt the travel of said second means in one direction and the other of which is adapted to interrupt the travel of the same in the opposite direction, said latches being provided with inclined faces upon the sides remote one from another and being spring pressed into operative position.

15. In apparatus of the class described, in combination, a driving member, a member driven therefrom, speed changing means interposed between said driving and said driven members and adapted to vary the rate of drive, said speed changing means comprising a member adapted to assume a plurality of operative positions, means connected with and controlling the position of said member, a lever mounted adjacent said means adapted to swing away from the same, and a pair of latches upon said lever, one of which is adapted to interrupt the travel of said second means in one direction and the other of which is adapted to interrupt the travel of the same in the opposite direction, said latches being provided with inclined faces upon the sides remote one from another and being spring pressed into operative position, and said lever being spring pressed into such position as automatically to hold said latches in operative relation to said second-mentioned means.

16. In apparatus of the class described, in combination, an axle, car wheels mounted thereon, a driving member upon said axle, speed changing mechanism upon said axle adapted to transmit power from said driving member to said wheels and vary the rate of drive of said wheels, a cylinder, a piston within said cylinder connected to and adapted to actuate said speed changing mechanism, a car body above said axle, means positioned within said car body adapted to control the admission of a compressed fluid to said cylinder and govern the action of said speed changing means, and means controlled within said car body adapted to lock said speed changing means in an inoperative position.

17. In apparatus of the class described, in combination, an axle, car wheels mounted thereon, a driving member upon said axle, speed changing mechanism upon said axle adapted to transmit power from said driving member to said wheels and vary the rate of drive of said wheels, a cylinder, a piston within said cylinder connected to and adapted to actuate said speed changing mechanism, a car body above said axle, means positioned within said car body adapted to control the admission of a compressed fluid to said cylinder and govern the action of said speed changing means, and means controlled within said car body adapted to lock said speed changing means in an inoperative position, said last-mentioned means comprising an automatically acting lever provided with parts projecting within the path of travel of a member connected with said speed changing means and adapted to arrest the movement thereof.

18. In apparatus of the class described, in combination, a car floor, car wheels, means mounted beneath said floor and adapted to transmit power to said wheels, speed changing means interposed within said power transmitting means, means controlling the action of said speed changing means and positioned above the car floor, means adapted to interrupt the action of said speed changing means, and means adapted to release said last-mentioned means and positioned above said car floor.

19. In apparatus of the class described, in combination, a car floor, car wheels, means mounted beneath said floor and adapted to transmit power to said wheels, a positive clutch interposed within said power transmitting means, means controlling the action of said positive clutch and positioned above the car floor, means adapted to interrupt the action of said positive clutch, and means adapted to release said last-mentioned means and positioned above said car floor.

20. In apparatus of the class described, in combination, a car floor, car wheels, means mounted beneath said floor and adapted to transmit power to said wheels, speed changing means interposed within said power transmitting means, means controlling the action of said speed changing means and positioned above the car floor, means adapted to interrupt the action of said speed changing means, and means adapted to release said last-mentioned means and positioned above said car floor, said interrupting means comprising a pair of spring pressed latches normally lying in the path of a member connected with said speed changing means.

21. In apparatus of the class described, in combination, a car floor, car wheels, means mounted beneath said floor and adapted to transmit power to said wheels, speed changing means interposed within said power transmitting means, means controlling the action of said speed changing means and positioned above the car floor, means adapted to interrupt the action of said speed changing means, and means adapted to release said last-mentioned means and positioned above said car floor, said interrupting means comprising a pair of spring pressed latches normally lying in the path of a member connected with said speed changing means and provided with abrupt faces upon the sides adjacent one another and inclined faces upon the sides remote one from another, whereby said member is engaged and stopped upon meeting said latches in either direction.

22. In apparatus of the class described, in combination, a car floor, car wheels, means mounted beneath the floor adapted to transmit power to said wheels, speed changing means interposed within said power transmitting means comprising a member adapted to assume a plurality of operative positions, a member connected with said member and controlling the position thereof, means controlled above said car floor adapted to actuate said speed changing means, and means extending above said car floor adapted to interlock with said last-mentioned member and hold said first member in inoperative position.

23. In apparatus of the class described, in combination, a car floor, car wheels mounted beneath the floor adapted to transmit power to said wheels, speed changing means interposed within said power transmitting means comprising a member adapted to assume a plurality of operative positions, a member connected with said member and controlling the position thereof, means controlled above said car floor adapted to actuate said speed changing means, and means extending above said car floor adapted to interlock with said last-mentioned member and hold said first member in inoperative position, said last means comprising a foot lever having pivoted thereon a pair of spring pressed latches one of which is adapted to interrupt the travel of said last member in one direction and the other of which is adapted to interrupt the travel of said last member in the other direction.

24. In apparatus of the class described, in combination, a car floor, car wheels, means mounted beneath the floor adapted to transmit power to said wheels, speed changing means interposed within said power transmitting means comprising a member adapted to assume a plurality of operative positions, means connected with said member and controlling the position thereof, and a foot lever projecting above the car floor and provided with a pair of spring pressed latches one of which is adapted to interrupt the travel of said last member in one direction and the other of which is adapted to interrupt the travel of the same in the opposite direction, said foot lever being spring pressed to hold said latches normally in operative position.

25. In apparatus of the class described, in combination, a shaft, a member secured to said shaft to turn therewith and slidable thereon, said member being provided upon each side with clutch teeth, a pair of gears loosely mounted on said shaft, and respectively provided with clutch teeth adapted alternatively to co-act with the teeth upon said member, actuating means connected with said member and adapted to transmit power thereto to slide the same along said shaft, locking means provided with a recess adapted to co-act with a part in rigid relation to said actuating means to hold said slidable member in intermediate position, a spring tending to force said locking means and actuating means into operative relation one to another, and means adapted to overcome said spring and release said actuating means, said actuating means comprising a fork pivoted lever and a sliding rod connected thereto through which power is transmitted to said lever.

In testimony whereof I affix my signature, in the presence of two witnesses.

WILLIAM R. McKEEN, Jr.

Witnesses:
H. P. VAN ARSDALE,
CHAS. W. LOUCKS.